United States Patent
Ali et al.

(10) Patent No.: US 6,899,399 B2
(45) Date of Patent: May 31, 2005

(54) ATTACHMENT ASSEMBLY FOR SECURING TRIM MATERIAL TO THE PADDING OF A VEHICLE SEAT

(75) Inventors: Asad S. Ali, Troy, MI (US); Larry Hamilton, Marine City, MI (US); Kim Alsbury, Macomb, MI (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 10/614,920

(22) Filed: Jul. 8, 2003

(65) Prior Publication Data

US 2005/0006944 A1 Jan. 13, 2005

(51) Int. Cl.$^7$ ............................................. A47C 31/02
(52) U.S. Cl. ...................................... 297/452.6; 5/403
(58) Field of Search .................... 297/452.6; 5/402–407

(56) References Cited

U.S. PATENT DOCUMENTS

| | | | | |
|---|---|---|---|---|
| 3,632,164 A | * | 1/1972 | Radke | 297/452.6 |
| 3,794,378 A | | 2/1974 | Haslam et al. | 297/219 |
| 3,925,861 A | * | 12/1975 | Tillner | 24/1 |
| 4,609,226 A | * | 9/1986 | Yoshizawa | 297/452.6 |
| 4,643,480 A | | 2/1987 | Morita | 297/218 |
| 4,789,201 A | | 12/1988 | Selbert | 292/218 |
| 4,833,741 A | * | 5/1989 | Mizuno et al. | 5/404 |
| 4,865,383 A | | 9/1989 | Sbaragli et al. | 297/218 |
| 5,586,807 A | | 12/1996 | Taggart | 297/218.5 |
| 5,641,552 A | | 6/1997 | Tillner | 428/102 |
| 5,702,159 A | | 12/1997 | Matsuoka et al. | 297/452.48 |
| 5,733,001 A | | 3/1998 | Roberts | 297/218.1 |
| 5,762,842 A | * | 6/1998 | Burchi et al. | 264/46.4 |
| 5,879,055 A | | 3/1999 | Dishner et al. | 297/452.38 |
| 5,882,073 A | | 3/1999 | Burchi et al. | 297/218.2 |
| 5,964,017 A | | 10/1999 | Roberts | 29/91.1 |
| 6,206,467 B1 | | 3/2001 | Mense et al. | 297/218.2 |
| 6,364,347 B1 | | 4/2002 | Holdampf et al. | 280/730.2 |
| 6,382,665 B2 | | 5/2002 | Holdampf et al. | 280/730.2 |
| 2001/0019202 A1 | | 9/2001 | Holdampf et al. | 280/730.2 |
| 2002/0024243 A1 | | 2/2002 | Peterson | 297/218.2 |
| 2002/0043833 A1 | | 4/2002 | Michot et al. | 297/218.2 |
| 2002/0074845 A1 | | 6/2002 | Perske et al. | 297/452.6 |
| 2002/0101109 A1 | * | 8/2002 | Stiller et al. | 297/452.6 |
| 2003/0001421 A1 | * | 1/2003 | Schmidt | 297/452.6 |

FOREIGN PATENT DOCUMENTS

| | | |
|---|---|---|
| EP | 1 186 468 A1 | 3/2002 |
| FR | 002777879 A | 4/1998 |
| WO | WO 01/24665 A1 | 4/2001 |
| WO | WO2003/070509 | 8/2003 |

* cited by examiner

*Primary Examiner*—Peter M. Cuomo
*Assistant Examiner*—Stephen D'Adamo
(74) *Attorney, Agent, or Firm*—Bliss McGlynn, P.C.; Bill Panagos

(57) ABSTRACT

The present invention relates to a trim material attachment assembly for securing trim material to the padding of a vehicle seat. The present invention includes an elongate wedge having a wedge tip and opposed walls joined at the wedge tip. The opposed walls extend angularly outward to define a substantially V-shaped channel adapted to receive the trim material of a vehicle seat. The trim material attachment assembly further includes a receiving member having a base adapted to engage the padding of a vehicle seat, a centrally located elevated platform and cantilevered retention tabs extending from the elevated platform. The cantilevered retention tabs are adapted to operatively receive the elongate wedge. Each of the cantilevered retention tabs includes a guide deck adapted to provide positive placement of the elongate wedge and an engaging flange adapted to releasably engage the elongate wedge juxtaposed therebetween.

19 Claims, 3 Drawing Sheets

ATTACHMENT ASSEMBLY FOR SECURING TRIM MATERIAL TO THE PADDING OF A VEHICLE SEAT

BACKGROUND OF THE INVENTION

1. Field of the Invention

The present invention relates, generally, to an attachment assembly for securing trim material to the padding of a vehicle seat. More specifically, the present invention relates to a vehicle seat trim attachment assembly for securing the seat trim to the seat padding in trench attachment applications to provide a narrow trench width and positive trim attachment.

2. Description of the Related Art

Generally speaking, a vehicle seat includes three fundamental components: (a) frame to support the seat and to mount it to a vehicle; (b) padding to cover the frame; and (c) trim material to cover the padding and provide a durable surface for contact with a vehicle occupant. Typically, the pad is made from an expandable foam material, such as a polymer, and molded to a predetermined shape during a molding process. For example, the predetermined shape of a bucket-style seat includes raised front, side, and rear bolster areas and recessed central seating and back sections. Further, the padding may also vary in thickness for ergonomic or cosmetic reasons. The trim material may include any number of materials, such as cloth, polymers or leather. Often, the selection of trim material is governed by the sale price of the vehicle. For example, leather trim material may be used for luxury vehicles while cloth and polymer materials may be used for less expensive vehicles. In either event, the trim is attached to the padding or the frame or both through an attachment assembly.

Seat trim attachment assemblies are commonly known in the automotive industry. In particular, seat trim attachment assemblies generally fall into one of two types: close out attachment applications and trench attachment applications. Close out attachment applications refer to those where the attachment assembly is not readily visible by vehicle occupants as they are commonly located along the underside of a seat. On the other hand, trench attachment applications refer to those where the attachment area is readily visible by vehicle occupants. With respect to a bucket-style seat, trench applications are employed along the areas where the raised bolsters meet the recessed central seating and back sections, creating a valley or trench where the trim material is secured to avoid the appearance of loose fitting trim material.

In high-end vehicles, the areas of a vehicle seat that require a trench attachment application are hand-stitched or mechanically sewn to minimize the width of the trench area and therefore maximized the padding area of the seat. Hand-stitching or mechanically sewing the trim material to the padding in the trench application areas also provides a straight trench, commonly referred to as, "positive trim attachment," which is preferred for quality and aesthetic reasons. However, hand stitching or mechanically sewing the trim material is often cost-prohibitive. Accordingly, seat trim attachment assemblies for trench applications strive to duplicate the "sewn-look" without incurring the associated cost by attempting to minimize the trench width and increase positive trim attachment.

Several attachment assemblies are known in the art for attaching seat trim material in trench attachment applications. Such assemblies includes hog ring attachment assemblies of the type disclosed in U.S. Pat. No. 4,643,480 issued to Morita on Feb. 17, 1987 and U.S. Pat. No. 5,586,807 issued to Taggart on Dec. 24, 1996; hook-eye attachment assemblies of the type disclosed in U.S. Pat. Nos. 5,602,159 issued to Matsuoka et al on Dec. 30, 1997, and U.S. Pat. No. 6,206,467, issued to Mense et al. on Mar. 27, 2001; and J-hook attachments of the type disclosed in U.S. Pat. No. 5,879,055 issued to Dishner et al. on Mar. 9, 1999.

Another type of attachment assembly used to secure trim material to a seat includes a protruding member secured to the trim material that interlocks with a base member secured to the seat padding having a plurality of apertures or key-hole recesses. Devices of this type are disclosed in U.S. Pat. No. 3,794,378 issued on Feb. 26, 1974 to Haslam et al.; U.S. Pat. No. 5,733,001 issued on Mar. 31, 1998 to Roberts; and U.S. Pat. No. 5,641,552 issued on Mar. 16, 1999 to Burchi et al. The afore-mentioned devices employ a rectangular elongate base secured to the seat padding to engage a protruding member secured to the seat trim. However, the rectangular elongate base members are unable to be employed where the trench curves around the seat bolsters.

While the vehicle seat trim attachment assemblies for trench attachment applications of the type known in the related art have generally worked for their intended purposes, they suffer from the disadvantages of limited positive trim attachment in trench applications as well as increased trench width. In addition, the vehicle seat trim attachment assemblies for trench attachment applications of the type known in the related art suffer from the disadvantage of cumbersome assembly associated with securing the trim material to the seat padding. Thus, there remains a need in the art for an attachment assembly that provides a quality, desirable, trench width and positive trim attachment that is aesthetically pleasing and reduces costs associated with securing the trim material to the seat padding.

SUMMARY OF THE INVENTION

The present invention overcomes the disadvantages in the related art in attachment assemblies for vehicle seat trim material and generally fulfills a need in the art for an attachment assembly for a vehicle seat trim material in trench applications providing reduced trench width and improving positive trim attachment for improved aesthetic and ergonomic quality. To this end, the trim material attachment assembly of the present invention includes an elongate wedge having a wedge tip, opposed walls joined at the wedge tip. The opposed walls extend angularly outward from the wedge tip toward a terminal end. Each of the opposed walls includes interior and exterior sides. The interior sides define a substantially V-shaped channel adapted to receive the trim material of a vehicle seat. The trim material attachment assembly further includes a receiving member including a base for operatively engaging the padding of a vehicle seat. The base includes a centrally located elevated platform and cantilevered retention tabs extending from the elevated platform. The cantilevered retention tabs are adapted to operatively receive the elongate wedge threbetween. Each of the cantilevered retention tabs further include a guide deck adapted to provide positive placement of the elongate wedge. Each of the cantilevered retention tabs also include an engaging flange adapted to releasably engage the terminal end of the opposed walls when the elongate wedge is juxtaposed between the cantilevered retention tabs.

Accordingly, one advantage of the present invention is that it provides increased positive trim attachment between the trim material and the padding of a vehicle seat for improved trim-to-pad contact and aesthetically pleasing outward trench appearance.

Another advantage of the present invention is that it provides reduced trench width in the vehicle seat pad to improve seat comfort and durability relating to increased pad material at the trench locations Yet another advantage of the present invention is that it reduces the visualization of the trench width on the trim material thereby improving the aesthetic quality of a vehicle seat.

Still another advantage of the present invention is that it provides a trim attachment assembly that reduces assembly costs by reducing costs associated with securing the trim material to the seat padding and eliminating the need for specialized tools.

Still another advantage of the present invention is that it provides a trim attachment assembly suitable for use in curved trench applications.

Still another advantage of the present invention is that it reduces the costs of seat padding formation and the seat assembly associated with trim material attachment to the seat padding by permitting the receiving members to be arranged in a virtually infinite number of ways within the same padding mold.

Other objects, features, and advantages of the present invention will be readily appreciated, as the same becomes better understood, after reading the subsequent description taken in conjunction with the accompanying drawings.

DETAILED DESCRIPTION OF THE INVENTION

Figure 1:
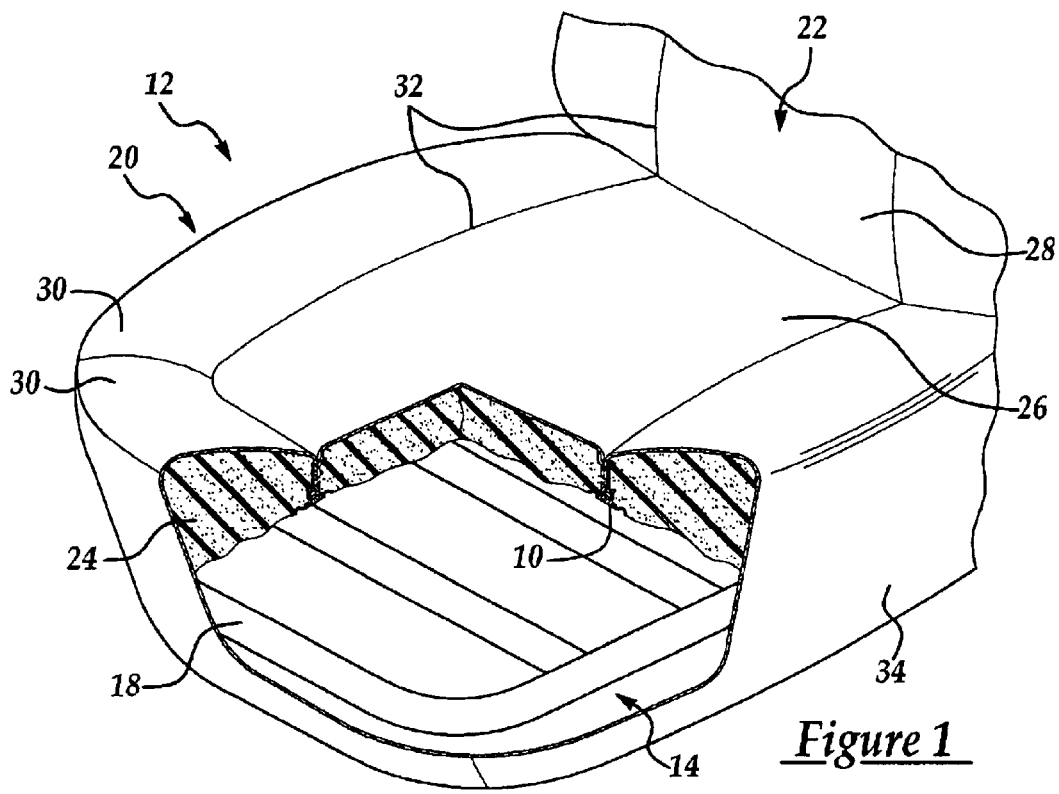
FIG. 1 is a cut-away environmental view of a vehicle seat assembly including an attachment assembly for securing the trim material to the foam padding in accordance with an embodiment of the present invention.

Referring now to the figures, where like numerals are used to designate like structure throughout to the drawings, an attachment assembly of the present invention is generally shown at 10 in FIG. 1. As shown in FIG. 1, the present invention 10 is an attachment assembly for securing seat trim material to the padding of a vehicle seat in a trench application. However, those having ordinary skill in the art will appreciate that the present invention may be employed anywhere a trench attachment application occurs. By way of example, the present invention may be employed within the center console armrest of a vehicle or within the cushioned headrest of a vehicle seat.

Referring to FIGS. 1–5, the present invention is employed within a vehicle seat, generally shown at 12. The vehicle seat 12 includes a seat frame, generally indicated at 14 having a plurality of mounting brackets 16 adapted to operatively secure said seat frame 14 within a vehicle. The vehicle seat 12 also includes an infrastructure, generally indicated at 18, defining a central seating region 20 and a central back support region 22 of a vehicle seat 12. The infrastructure 18 includes a number of components such as springs, a track assembly, reclining components and a number of other related components not shown here, but commonly known in the art. The seat frame 14 may be constructed from any material suitable for application within a vehicle seat 12, such as aluminum, steel or other metal alloy or a suitable polymer. Further, the seat frame 14 may be manufactured using any technique commonly known in the art, relative to the type of material employed. By way of example, manufacturing techniques may include stamping, welding, fastening, or molding a suitable material to form a seat frame 14.

The vehicle seat 12 further includes padding generally indicated at 24. Padding 24 is secured to the infrastructure 18 of the seat frame 14. Padding 24 may be secured to the infrastructure 18 by any method generally known in the art. By way of example, an adhesive may be employed to secure the padding 24 to the skeletal infrastructure 18. The padding 24 includes a central seating pad 26, a central back support pad 28, a plurality of bolsters 30 substantially surrounding the central seating pad 26 and the central back support pad 28. Further, the padding 24 includes a plurality of trenches 32 defined therein. Trenches 32 are defined along the area where the bolsters 30 contact the central seating pad 26 and the central back support pad 28. However, trenches 32 may be employed in other areas of the padding 24 for aesthetic or functional reasons. Generally speaking, the trench width may be governed by the size of the trim attachment assembly components and/or the manner in which the components are secured to the padding 24, since removal of the padding 24 around a trench 32 will widen the outward appearance of a given trench width. The trench width of the present invention may range between 12 and 2 millimeters, with a preferred trench width of 3–6 millimeters. The padding 24 has a predetermined density and resiliency that may vary among the different areas of the vehicle seat 12. Whatever the density and resiliency of a particular padding area, the padding 24 is designed to impart a soft feel, yet remain resistant to pressures applied thereto. Those having ordinary skill in the art will appreciate that the padding material may include any material generally known in the art. By way of example, the padding material may include an expandable polymer foam. Further, those having ordinary skill in the art will appreciate that the padding 24 may be shaped to a predetermined form corresponding to a vehicle seat 12 or a portion thereof by any method generally known in the art. By way of example, an expandable polymer foam may be injected into a mold having a mold cavity conforming to the shape of a vehicle seat 12 or portion thereof.

The vehicle seat 12 also includes a trim material 34 adapted to engage said padding 24 in a covering relation. The trim material 34 may include any material commonly known in the art. By way of example, some of the known materials include cloth, leather, or polymers of sufficient quality and thickness for use in seat trim applications. Polymer trim material may include a flexible closed-cell polymer skinning material such as polyvinyl, polyvinyl chloride (PVC), thermoplastic olefin (TPO), or thermoplastic urethane (TPU). Additionally, materials for use as trim material 34 may include a foam backing (not shown, but generally known in the art) which may be manufactured from a variety of polymer foam materials. By way of example, the foam backing may be polyethylene, polypropylene, polyurethane, or a polystyrene foam. Optionally, a mesh or reinforcing material (not shown, but generally known in the art) such as fiberglass or nylon may be applied to the foam backing or back of the trim material 34 for increased strength without increasing rigidity.

Figure 2:
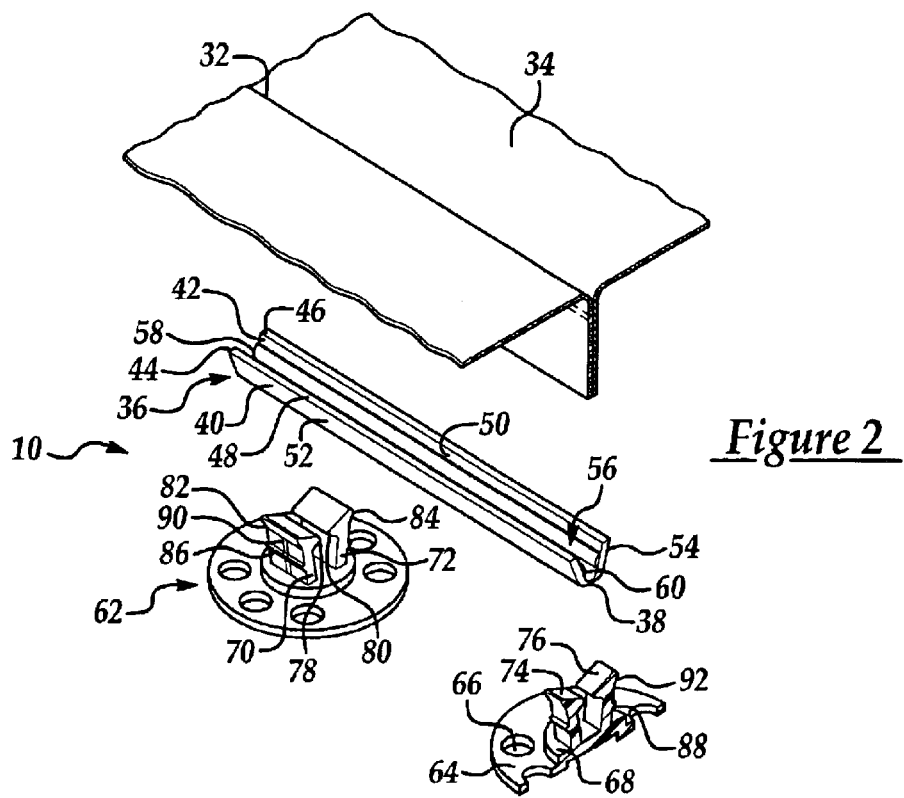
FIG. 2 is an enlarged exploded view of the trim material attachment assembly in accordance with an embodiment of the present invention.
Figure 3:
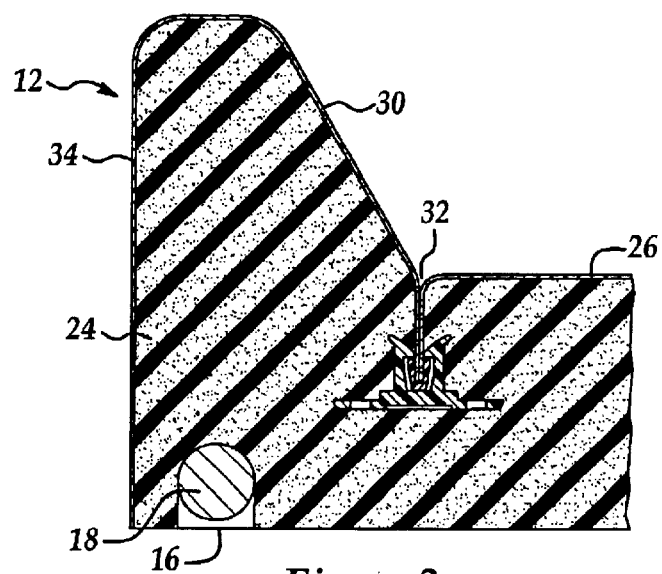
FIG. 3 is an enlarged cross-sectional view the trim material attachment assembly in accordance with an embodiment of the present invention.

Referring to FIGS. 1–3, the trim material attachment assembly 10 for securing trim material 34 to the padding 24 of a vehicle seat 12 in accordance with one embodiment includes an elongate wedge, generally indicated at 36, operatively engaged to the trim material 34. Material for constructing the elongate wedge 36 may include any material commonly known in the art for trim material attachment assemblies. Such materials may include any polymer. Preferably, the elongate wedge 36 is constructed from a semi-rigid forming polymer to provide a predetermined degree of flexibility.

Further referring to FIGS. 1–3, the elongate wedge 36 includes a wedge tip 38 and opposed walls 40,42 joined at the wedge tip 38. Each of the opposed walls 40,42 extend angularly outward from the wedge tip 38 toward their respective terminal ends 44,46. The opposed walls 40,42 have interior sides 48,50 and exterior sides 52,54 where the interior sides 48,50 cooperate to define a substantially V-shaped channel 56 adapted to receive the trim material 34. Those having ordinary skill in the art will appreciate that the trim material 34 may operatively engage the elongate wedge 36 through several different methods commonly known in the art for securing a component of a trim material attachment assembly to trim material 34. By way of example, such methods may include sewing the elongate wedge 36 to the trim material 34 or employing an adhesive or epoxy to secure the trim material 34 to an elongate wedge 36 or employing an intermediate material 197 (See FIG. 5) attached to the trim material 34 to secure same to the elongate wedge 36 via sewing or bonding. The interior sides 48,50 of the elongate wedge 36 further include at least one ridge 58,60 extending parallel to the wedge tip 38 adapted to facilitate retention of the trim material 34 to the elongate wedge 36.

The trim material attachment assembly 10 for securing trim material 34 in accordance with one embodiment further includes a receiving member, generally indicated at 62, operatively engaged to the padding 24. The receiving member 62 may engage the padding 24 through any method generally known in the art. By way of example, methods for securing a trim material attachment assembly component to the padding 24 of a seat 12 include applying adhesive, sewing the component to the padding 24, or bonding the component to the padding 24 during the formation. Preferably, the receiving member 62 is bonded to the padding 24 while the padding 24 is formed in a mold. This method integrates the receiving member 62 within the pad 24 to reduce the likelihood of separation or rotation. Further, the padding 24 surrounding the trench 32 is not removed to accommodate the receiving member 62. Rather, the padding 24 covers a portion of the receiving member 62, thereby maximizing the padding 24 around the trench 32 and minimizing the outward appearance of trench width.

The receiving member 62 of the trim material attachment assembly 10 includes a base 64. The base 64 includes a plurality of apertures 66 adapted to operatively engage the padding 24 of a vehicle seat 12. The apertures 66 further improve the bond between the receiving member 62 and the padding 24. The base 64 is shaped in a substantially circular manner to enable the receiving member 62 to be employed within curved trenches 32. More specifically, the substantially circular shape permits the receiving member 62 to be employed along the apex of a trench 32 curve. Alternatively, the shape of the base 64 may be octagonal, hexagonal, or other substantially circular shape having defined corners.

With continuing reference to FIGS. 1–3, the receiving member 62 includes an elevated platform 68. The elevated platform 68 is substantially circular in shape and centrally located on the base 64. However those having ordinary skill in the art will appreciate that the elevated platform 68 is not limited to a circular shape. By way of example, the shape of the elevated platform 68 may be square, triangular or irregularly shaped. Further, while the apertures 66 are circumferentially spaced around the elevated platform 68, those having ordinary skill in the art will appreciate that the apertures 66 may be spaced in any manner along the base 64. Additionally, the function of the elevated platform 68 is directed at providing a positive stop for the elongate wedge 36 when engaged by the receiving member 62. Alternative embodiments of the receiving member 62 of the trim material attachment assembly 10 may include removing the elevated platform 68 and replacing same with a structure to accomplish a similar end.

The receiving member 62 of the trim attachment assembly 10 further includes cantilevered retention tabs 70,72 extending from the elevated platform 68. The cantilevered retention tabs 70,72 are adapted to operatively receive the elongate wedge 36 threbetween. As shown in FIGS. 2 and 3, two opposed cantilevered retention tabs 70,72, are centrally located on one side of the base 64. However, those having ordinary skill in the art will appreciate that there may exist any number of cantilevered retention tabs 70,72 positioned at any predetermined location on the base 64. By way of example, the trim panel attachment assembly 10 of the present invention may include two pair of opposed cantilevered retention tabs linearly aligned along the perimeter of the base 64.

Each of the cantilevered retention tabs 70,72 includes a guide deck 74,76 and an engaging flange 78,80. The guide decks 74,76 are adapted to provide positive placement of the elongate wedge 36 during attachment. Specifically, each guide deck 74,76 extends from the terminal ends 82,84 of each cantilevered retention tab 70,72, defining a downwardly converging plane, and has a terminal end at the engaging flanges 78,80, thereby directing the elongate wedge 36 into the proper position during engagement. The engaging flanges 78,80 are adapted to releasably engage the terminal end 44,46 of the opposed walls 40,42 when the elongate wedge 36 is juxtaposed between the cantilevered retention tabs 70,72. The cantilevered retention tabs 70,72 further include a latitudinal support rib 86,88 located between the elevated platform 68 and the guide deck 74,76 and a longitudinal support rib 90,92 extending from the elevated platform 68 and terminating at the guide deck 74,76. The support ribs 86,88,90,92 provide rigidity to the cantilevered retention tabs 70,72 while maintaining a level of flexibility to accommodate the elongate wedge 36 during engagement. Furthermore, should the trim material 34 become worn or otherwise need to be replaced, the elongate wedge 36 may be disengaged through the application of pressure on the guide decks 74,76.

Figure 4:
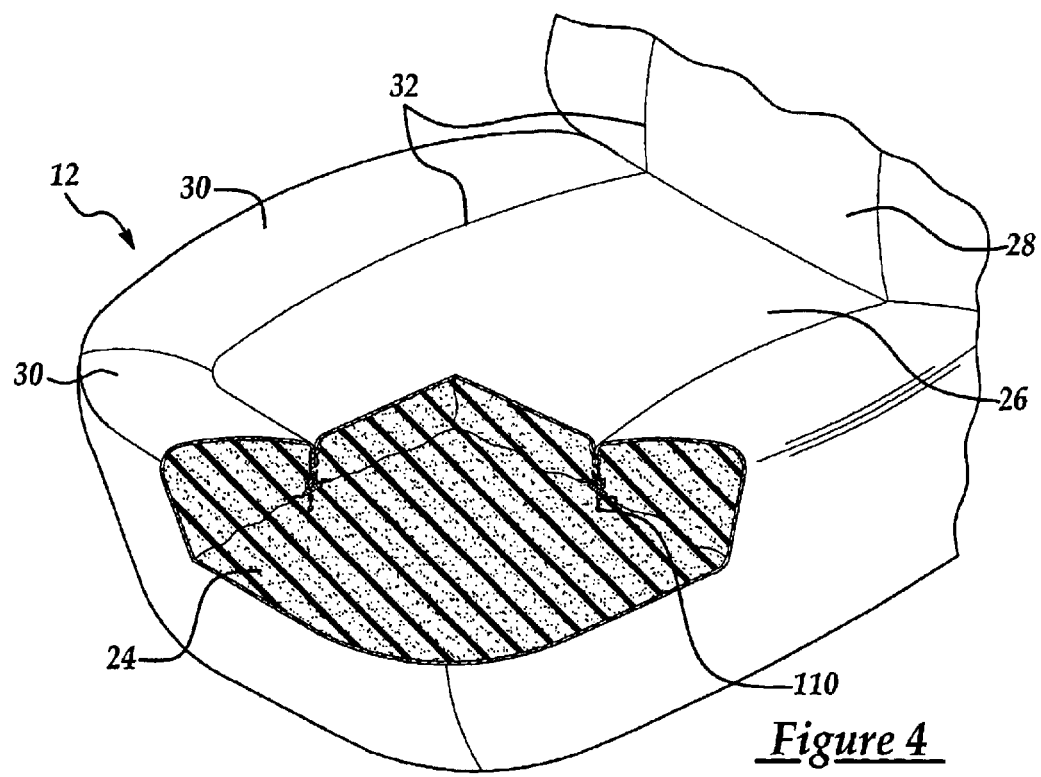
FIG. 4 is a cut-away environmental view of a vehicle seat assembly including an attachment assembly for securing the trim material to the foam padding in accordance with another embodiment of the present invention.
Figure 5:
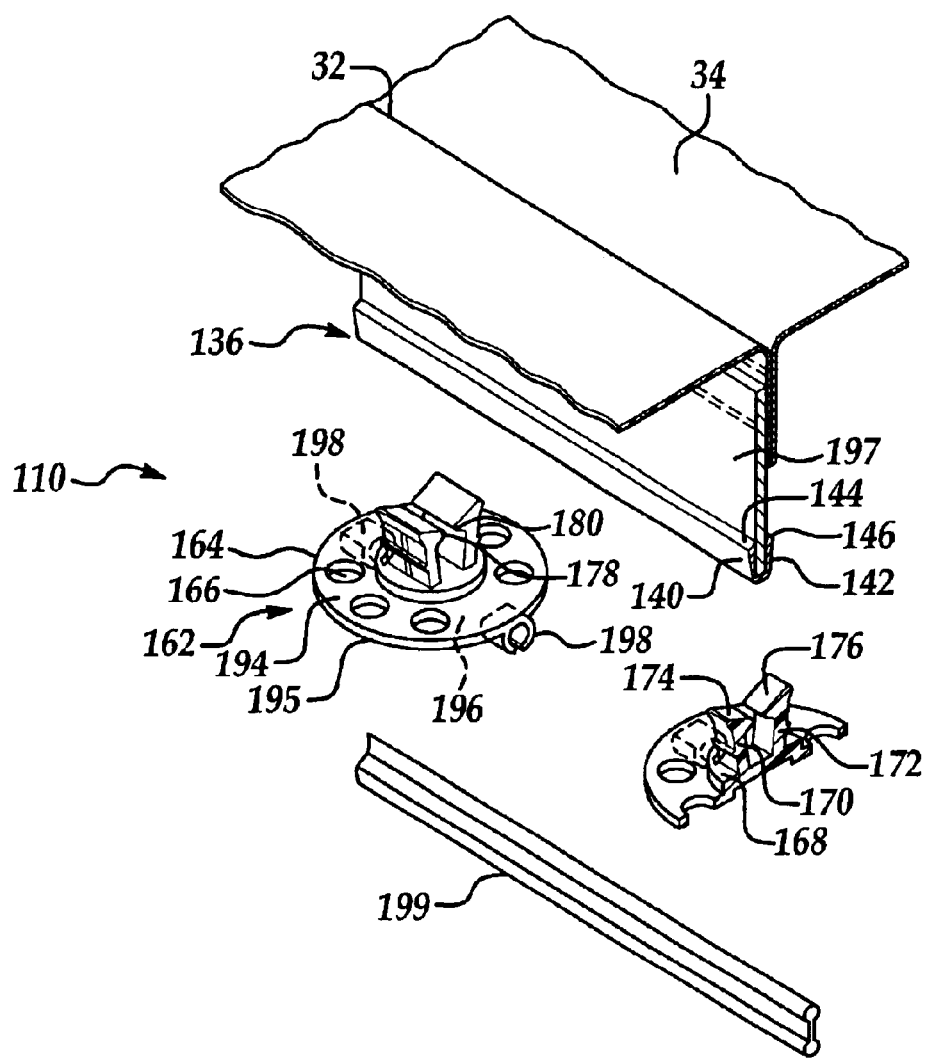
FIG. 5 is an enlarged exploded view of the trim material attachment assembly secured to the trim material and seat padding of a vehicle seat in accordance with another embodiment of the present invention.

Referring now to FIGS. 4 and 5 there is shown another embodiment of the attachment assembly is generally indicated at 110 in FIGS. 4 and 5 where like numerals, increased by 100 with respect to the embodiments of the invention in FIGS. 1–3, are used to designate like structure. The attachment assembly 110 is used for securing trim material 34 to the padding 24 of a vehicle seat 12. The elongate wedge 136 is similar to the elongate wedge 36 shown in FIGS. 1–3 and so the description of it will not be repeated here. Furthermore, the receiving member 162 is similar to the receiving member 62 shown in FIGS. 1–3 and will not be repeated here, except where expressly mentioned below. The receiving member 162 shown in FIGS. 4 and 5 includes a base 164 having a first side 194 for operatively engaging the elongate wedge 136 and a second side 195. The first side 194 includes an elevated platform 168 and cantilevered retention tabs 170,172 extending from the elevated platform 168. The cantilevered retention tabs 170,172 are adapted to operatively receive the elongate wedge 136 threbetween. Each of the cantilevered retention tabs 170,172 have a guide deck 174,176 and an engaging flange 178,180 adapted to releasably engage the terminal end 144,146 of the opposed walls 140,142 when the elongate wedge 136 is juxtaposed between the cantilevered retention tabs 170,172.

The second side 195 of the base 164 includes a channel 196 for operatively engaging the padding 24 of a vehicle seat 12. The channel 196 is positioned along the opposite side of the base 164 relative to the cantilevered retention tabs 170,172. The channel 196 is defined by a plurality of linearly aligned clips 198. Similar to the apertures 166 within the base 164 of the receiving member 162, the clips 198 also provide additional bonding between the padding 24 and the receiving member 162.

The alternative embodiment 110 of the present invention as shown in FIGS. 4 and 5 further includes a flexible elongate ganging member 199 adapted to join a plurality of receiving members 162 together. The flexible elongate ganging member 199 slidably engages the clips 198 of the receiving member 162. Joining a plurality of receiving members 162 together reduces the need to individually place/position each receiving member 162 in a specific location on the padding 24 and ensure that they maintain their position. Furthermore, the position of each receiving members 162 may be infinitely changed without changing the mold or method of applying the receiving member 162 to the padding 24.

The present invention 10,110 employs an elongate wedge 36,136 secured to a trim material 34 to releasably engage a plurality of receiving members 62,162 situated within the padding 24 of a vehicle seat 12. Accordingly, the present invention 10,110 provides increased positive trim attachment between the trim material 34 and the padding 24 of a vehicle seat 12 for improved trim-to-pad contact and aesthetically pleasing outward trench 32 appearance. Further, the present invention 10,110 integrates the receiving member 62,162 with the padding 24 surrounding a trench 32 during the formation of the padding 24 while in the mold. Accordingly, the present invention 10,110 provides reduced trench width in the vehicle seat padding 24 to improve seat 12 comfort and durability relating to increased padding material at trench 32 locations. Further, the present invention 10,110 employs a narrow elongate wedge 36,136 for engaging the cantilevered retention tabs 70,72,170,172 of a plurality of receiving members 62,162 within vehicle seat padding 24. The present invention 10,110 provides a reduced trench width within the trim material 34 of a vehicle seat 12. Further, the present invention 10,110 employs a plurality of receiving members 62,162 having cantilevered retention tabs 70,72,170,172 to releasably engage a flexible elongate wedge 36,136 upon the application of force thereto. The present invention 10,110 reduces assembly costs associated with securing the trim material 34 to the seat padding 24 by eliminating the need to specialized tools. Further the present invention 10,110 employs a substantially circular receiving member 62,162 adapted to operatively engage the padding 24 of a vehicle seat 12 and a flexible elongate wedge 36,136 adapted to engage a plurality of substantially circular receiving members 62,162. The present invention 10,110 provides a trim attachment assembly suitable for use in curved trench 32 applications. Further the present invention 10,110 employs a receiving member 62,162 having a channel 196 and a flexible ganging member 199 adapted to engage the channel 196 of a plurality of receiving members 62,162. Accordingly, the present invention 10,110 reduces costs of seat padding 24 production and seat trim-to-padding assembly by permitting the receiving members 62,162 to be arranged in a virtually infinite number of ways within the same padding mold.

The present invention has been described in an illustrative manner. It is to be understood that the terminology that has been used is intended to be in the nature of words of description rather than of limitation. Many modifications and variations of the present invention are possible in light of the above teachings. Therefore, within the scope of the appended claims, the present invention may be practiced other than as specifically described.

What is claimed is:

1. A trim material attachment assembly for securing trim material to the padding of a vehicle seat comprising:
   an elongate wedge including a wedge tip, opposed walls joined at said wedge tip and extending angularly outward therefrom toward a terminal end, said opposed walls each having interior and exterior sides, said interior sides defining a substantially V-shaped channel adapted to receive the trim material of a vehicle seat; and
   a receiving member including a base for operatively engaging the padding of a vehicle seat, an elevated platform disposed in spaced relation to said base and cantilevered retention tabs extending from said elevated platform adapted to operatively receive said elongate wedge therebetween, each of said cantilevered retention tabs having a guide deck adapted to provide positive placement of said elongate wedge and an engaging flange adapted to releasably engage said terminal end of said opposed walls when said elongate wedge is juxtaposed between said cantilevered retention tabs;
   wherein said cantilevered retention tabs each include at least one latitudinal support rib located between said elevated platform and said guide deck and at least one longitudinal support rib extending from said elevated platform and terminating at said guide deck.

2. A trim material attachment assembly as set forth in claim 1 wherein each of said interior sides include at least one ridge extending parallel to said wedge tip adapted to retain the trim material of a vehicle seat.

3. A trim material attachment assembly as set forth in claim 1 wherein said base is shaped in a substantially circular manner and includes a plurality of apertures adapted to operatively engage the seat padding of a vehicle seat.

4. A trim material attachment assembly as set forth in claim 1 wherein each of said guide decks extend from the terminal end of each of said cantilevered retention tabs, said guide decks defining downwardly converging planes, each guide deck having a terminal end at said engaging flanges.

5. A trim material attachment assembly as set forth in claim 1 further includes a flexible elongate ganging member adapted to join a plurality of said receiving members.

6. A trim material attachment assembly as set forth in claim 5 wherein said base includes a channel located on the opposite side of said base relative to said cantilevered retention tabs, said channel being adapted to receive said flexible elongate ganging member and operatively engage the padding of a vehicle seat.

7. A trim material attachment assembly as set forth in claim 6 wherein said channel is defined by a plurality of linearly aligned clips adapted to receive said flexible elongate ganging member and operatively engage the padding of a vehicle seat.

8. A trim material attachment assembly for securing trim material to the padding of a vehicle seat comprising:

an elongate wedge including a wedge tip, opposed walls joined at said wedge tip and extending angularly outward therefrom toward a terminal end, said opposed walls each having interior and exterior sides, said interior sides defining a substantially V-shaped channel adapted to receive the trim material of a vehicle seat;

a receiving member including a base having a first side for operatively engaging said elongate wedge and a second side including a channel for operatively engaging the padding of a vehicle seat, said first side including an elevated platform and cantilevered retention tabs extending from said elevated platform adapted to operatively receive said elongate wedge therebetween, each of said cantilevered retention tabs having a guide deck adapted to provide positive placement of said elongate wedge and an engaging flange adapted to releasably engage said terminal end of said opposed walls when said elongate wedge is juxtaposed between said cantilevered retention tabs; and a flexible elongate ganging member releasably secured within said channel and adapted to join a plurality of said receiving members.

9. A trim material attachment assembly as set forth in claim 8 wherein each of said interior sides include at least one ridge extending parallel to said wedge tip adapted to retain the trim material for a vehicle seat.

10. A trim material attachment assembly as set forth in claim 8 wherein said base is shaped in a substantially circular manner and includes a plurality of apertures circumferentially spaced around said elevated platform adapted to operatively engage the seat padding of a vehicle seat.

11. A trim material attachment assembly as set forth in claim 8 wherein said cantilevered retention tabs each include at least one latitudinal support rib located between said elevated platform and said guide deck and at least one longitudinal support rib extending from said elevated platform an terminating at said guide deck.

12. A trim material attachment assembly as set forth in claim 8 wherein each of said guide decks extend from the terminal end of each of said cantilevered retention tabs, said guide decks defining downwardly converging planes, each guide deck having a terminal end at said engaging flanges.

13. A trim material attachment assembly as set forth in claim 8 wherein said channel is defined by a plurality of linearly aligned clips adapted to receive said flexible elongate ganging member and operatively engage the padding of a vehicle seat.

14. A seat assembly for a vehicle having a seat trim attachment assembly comprising:

a seat frame including mounting brackets adapted to operatively secure said seat frame to a vehicle, an infrastructure defining a central seating region and a central back support region of a vehicle seat;

padding secured to said infrastructure having a predetermined density and resiliency, including a central seating pad, a central back support pad, a plurality bolsters substantially surrounding said central seating pad and said central back support pad, said padding including a plurality of trenches defined therein;

trim material adapted to engage said padding in a covering relation; and an attachment assembly including an elongate wedge operatively engaged to said trim material and a receiving member operatively engaged to said padding, said elongate wedge including a wedge tip, opposed walls joined at said wedge tip and extending angularly outward therefrom toward a terminal end, said opposed walls each having interior and exterior sides, said interior sides defining a substantially V-shaped channel adapted to receive said trim material, said receiving member including a base, an elevated platform disposed in spaced relation to said base, and cantilevered retention tabs extending from said elevated platform adapted to operatively receive said elongate wedge therebetween, each of said cantilevered retention tabs having a guide deck adapted to provide positive placement of said elongate wedge and an engaging flange adapted to releasably engage said terminal end of said opposed walls when said elongate wedge is juxtaposed between said cantilevered retention tabs;

wherein said cantilevered retention tabs each include at least one latitudinal support rib located between said elevated platform and said guide deck and at least one longitudinal support rib extending from said elevated platform and terminating at said guide deck.

15. A seat assembly for a vehicle having a seat trim attachment assembly as set forth in claim 14 wherein said base is shaped in a substantially circular manner and includes a plurality of apertures adapted to operatively engage said padding.

16. A seat assembly for a vehicle having a seat trim attachment assembly as set forth in claim 14 wherein each of said guide decks extend from the terminal end of each of said cantilevered retention tabs, said guide decks defining downwardly converging planes, each having a terminal end at said engaging flanges.

17. A seat assembly for a vehicle having a seat trim attachment assembly as set forth in claim 14 further includes a flexible elongate ganging member adapted to join a plurality of said receiving members.

18. A seat assembly for a vehicle having a seat trim attachment assembly as set forth in claim 17 wherein said base includes a channel positioned along the opposite side of said base relative to said cantilevered retention tabs, said channel adapted to receive said flexible elongate ganging member and to operatively engage said padding.

19. A seat assembly for a vehicle having a seat trim attachment assembly as set forth in claim 18 wherein said channel is defined by a plurality of linearly aligned clips adapted to receive said flexible elongate ganging member and to operatively engage said padding.

* * * * *